(12) United States Patent
Lipson et al.

(10) Patent No.: US 10,160,094 B2
(45) Date of Patent: Dec. 25, 2018

(54) INTELLIGENT POLISHER AND SYSTEM (71) Applicants: Ronald Lipson, Orchard Lake, MI (US); Timothy P. McIsaac, Rochester Hills, MI (US)

(72) Inventors: Ronald Lipson, Orchard Lake, MI (US); Timothy P. McIsaac, Rochester Hills, MI (US)

( * ) Notice: Subject to any disclaimer, the term of this patent is extended or adjusted under 35 U.S.C. 154(b) by 0 days.

(21) Appl. No.: 15/693,875

(22) Filed: Sep. 1, 2017

(65) Prior Publication Data
US 2018/0169829 A1 Jun. 21, 2018

Related U.S. Application Data (63) Continuation-in-part of application No. 15/386,657, filed on Dec. 21, 2016.

(51) Int. Cl.
*B24B 49/12* (2006.01)
*B24D 18/00* (2006.01)
*B24B 23/04* (2006.01)
*B24B 49/00* (2012.01)
*B60S 3/04* (2006.01)
*B24B 49/16* (2006.01)
*F21V 33/00* (2006.01)

(52) U.S. Cl.
CPC .............. *B24B 49/12* (2013.01); *B24B 23/04* (2013.01); *B24B 49/006* (2013.01); *B24B 49/16* (2013.01); *B60S 3/048* (2013.01); *F21V 33/00* (2013.01); *B24D 18/00* (2013.01)

(58) Field of Classification Search
CPC ....... B24D 7/18; B24D 18/00; B24D 18/0009
USPC ................................... 451/548, 65, 527, 528
See application file for complete search history.

(56) References Cited

U.S. PATENT DOCUMENTS 9,818,919 B2* 11/2017 Lowes .................... H01L 33/54
2004/0103490 A1* 6/2004 Long .................... A47L 11/125
15/22.1
2016/0342151 A1* 11/2016 Dey, IV ................. B25D 16/00

* cited by examiner

*Primary Examiner* — Michael Jennings
(74) *Attorney, Agent, or Firm* — John G. Posa; Belzer PC (57) ABSTRACT

An intelligent polishing system provides improvements to the polisher itself as well as networking capability enabling remote control and monitoring of multiple polishers. One or more electronic devices ensure that a user of the intelligent polisher operates the polisher to achieve optimum results. Such devices may include a polishing timer, a downward pressure sensor, or a tachometer to measure speed. The system may further include a memory for storing operational parameters or performance characteristics of the intelligent polisher for later downloading or retrieval. The same or a different memory may store calibration information to ensure that intelligent polisher operates within predetermined limits. Such operational parameters, performance characteristics or calibration information include RPM, polishing time, downward force or inlet air pressure. The system may further include a plurality of intelligent polishers, each in communication with a server enabling remote monitoring or control of the polishers through a computer or mobile device.

11 Claims, 6 Drawing Sheets

INTELLIGENT POLISHER AND SYSTEM

REFERENCE TO RELATED APPLICATIONS

This application is a continuation-in-part (CIP) of U.S. patent application Ser. No. 15/386,657, filed Dec. 21, 2016, the entire content of which is incorporated herein by reference.

FIELD OF THE INVENTION

This invention relates generally to surface polishing and buffing and, more particularly, to an intelligent polisher and system.

BACKGROUND OF THE INVENTION

Polishing small defects in the painted surfaces of automotive and other vehicles is a critical operation. Often vehicle surfaces are compromised during the painting process, and cars with visible scratches are not acceptable. There is no exact science to achieving an acceptable result other than providing a skilled operator with an air polisher and a pad. Polish is applied to the pad, the trigger is depressed, and after a few seconds the scratches usually go away.

Regardless of the system used, new paint system chemistry is making vehicle surface polishing much more difficult. In particular, new paint is harder and it takes longer to remove the defects. If more aggressive procedures are used the process can "go too far" and remove too much of the painted surface.

There are many important variables associated with polishing operations, none of which are computer monitored. Instead, lighting, applied pressure, and time of operation are left up to operator judgment, which can lead to human error.

SUMMARY OF THE INVENTION

This invention is directed to an intelligent polishing system that provides improvements to the polisher itself as well as networking capability enabling remote control and monitoring of multiple polishers, including random-orbital polishers. In addition to a source of illumination with a color temperature of at least 5000 degrees Kelvin or greater to mimic daylight, each polisher includes one or more electronic devices to ensure that a user of the intelligent polisher operates the polisher to achieve optimum results.

One of the electronic devices may be a timer operative to monitor the amount of time that the intelligent polisher is polishing a work surface, and an indicator enabling a user to know if a predetermined amount of time has been achieved. To set the length of polish time (in seconds), a timer is started that interfaces with the air (or electric) trigger. When de-pressed, the timer will start, and if 15 seconds is desirable (for example), then a sound or light indicator will let the operator know when the predetermined time has been reached.

Another one of the electronic devices may be a pressure sensor operative to monitor the amount of pressure that a user is applying to a work surface, and an indicator enabling a user to know if a predetermined amount of pressure has been achieved. The pressure pad on the polisher informs the operator and data collection exactly how much pressure is being applied to the polisher. An ideal pressure is in the range of 2-3 lbs.

A further one of the electronic devices may be a tachometer operative to measure speed of the rotating shaft in revolutions per minute (RPM), and an indicator enabling a user to know if the speed is within a predetermined range.

The system may further include a memory for storing operational parameters or performance characteristics of the intelligent polisher for later downloading or retrieval. The same or a different memory may store calibration information to ensure that intelligent polisher operates within predetermined parameters. Such operational parameters, performance characteristics or calibration information include RPM, polishing time, downward force or inlet air pressure. The system may further include communications circuitry in the intelligent polisher enabling operational parameters or performance characteristics to be delivered to a remote database.

The system may further include a plurality of intelligent polishers, each in communication with a server enabling remote monitoring or control of the polishers through a computer or mobile device. The intelligent polishers may be in two-way communication with the server, enabling a user of the computer or mobile device to alert a user of an intelligent polisher that the user is outside operational or performance guidelines. All system data may be stored on an operator, shift, and/or location basis. Supervisors and management can review all the stored data. Any issue or problem can be traced back to seconds of polishing, air pressure change, or pressure on polisher.

The system may further include a memory for storing information regarding operator use of the intelligent polisher for comparisons with subsequent use to improve operator usage behavior. Other improvements may include a larger, 15 mm random orbital polishing pattern, and an offset shaft to reduce vibration.

DETAILED DESCRIPTION OF THE PREFERRED EMBODIMENTS

This invention resides in an intelligent buffer/polisher especially suited to removing defects in painted surfaces, including painted cars, trucks and other vehicles including boats, and the like, and further including surfaces with state-of-the-art, hardened coats of paint or finish. While the invention is described in terms of a random-orbital polisher, the invention is also suited to other types of hand-held tools particularly in conjunction with the networked implementations of the invention described in further detail below. Further, while a plug-in tool is illustrated in some drawings, pneumatically operated and cordless tools are also anticipated. While rotary tools are applicable, in preferred embodiments the tool drives a random-orbital polishing pad of any suitable diameter, typically from 3 to 6 inches, though the invention is not limited in this respect.

Various aspects of the invention are considered to be patentably distinct. For example, the tool itself may have one or more of the improvements described herein, in any combination. Further the networked embodiments of the invention may also include any combination of the toll-related improvements as well.

Figure 1:
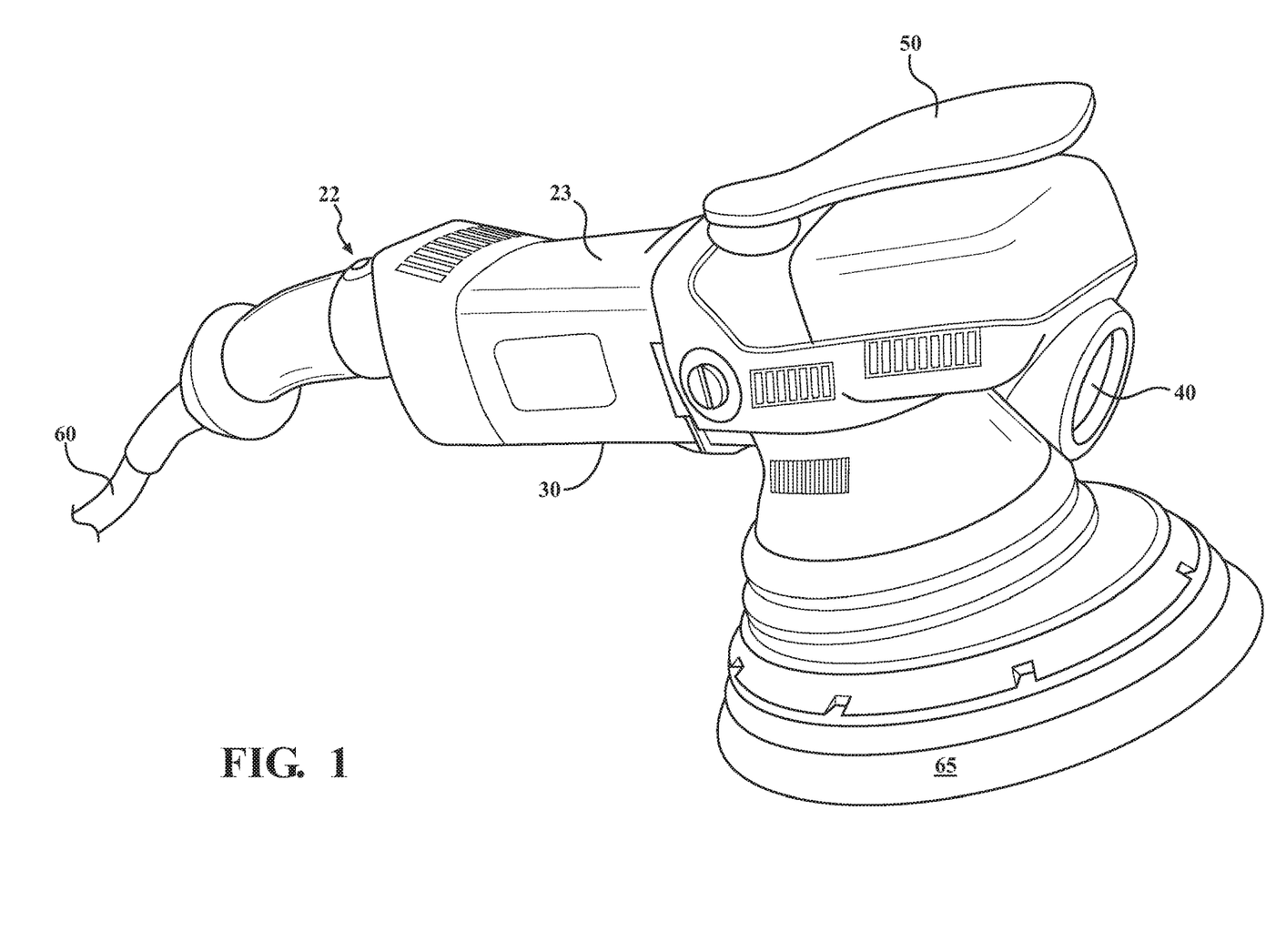
FIG. 1 is an oblique view of a polisher to which this invention is applicable.

As shown in FIG. 1, an intelligent polisher according to the invention comprises a hand-held, elongated housing including a power source defining an axis of rotation. The power source may be coupled to the polishing pad through any appropriate mechanism, including gears and the like such that the polishing pad may be at any angle relative to the axis of the motor. The tool includes a hand-held body with housing pieces 23, 30, and preferably further incorporates a pressure pad 50, the functionality of which is described herein. While a paddle shape is shown, other hand-held objects may be used such as knobs, buttons, and so forth. A series of counterweights between the gearbox and backing plate 65 convert the axial rotation into a pseudo-random orbital motion. The backing plate 65 includes a surface configured to receive polishing paper, typically through a hook-and-loop (i.e., Velcro®) attachment mechanism. Cord 60 may be an electrical cord, a pneumatic cable, or may be absent in the tool is cordless and battery-operated. With corded versions, the cable may also include electrical control signals as described herein below. With cordless versions the control signals are wireless.

In terms of improvements to the tool itself, an intelligent polisher according to the invention may include one or more of the following patentably distinct improvements, including a built-in inspection light, trigger time/RPM indication, and downward pressure monitoring. Each of these will be described in detail. The inspection light is described in pending U.S. patent application Ser. No. 15/386,657, incorporated herein by reference.

Built-in Inspection Light

Figure 2:
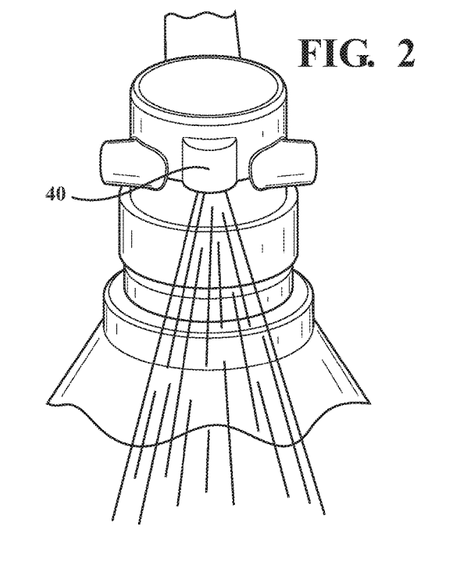
FIG. 2 is a detail view depicting an integrated inspection light.

The tool preferably includes a built-in inspection light 40 depicted in FIG. 1. As shown in FIG. 2, the light is preferably integrated into the front of the polisher housing for the purpose of illuminating the area being polished. The preferred light source is a set of light-emitting diodes that mimic daylight with two settings, 5000 and 6500 Kelvin, as described in co-pending U.S. patent application Ser. No. 15/386,657, the entire content of which is incorporated herein by reference. The light will preferably be rated at 97 CRI (color rendering index), 800 lumen. The tool may further include a speed control and a dimmer to control the intensity of light emitted by source of illumination.

Built-in Level

Figure 3:
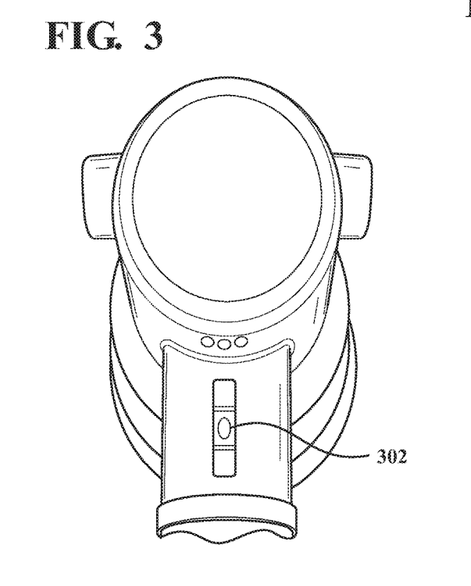
FIG. 3 is a detail view illustrating an integrated level.

Polishing perpendicular to the polished surface is very important. If the operator tips the polisher on edge, this increases the chance of creating wheel marks (holograms) in the paint surface, which are very difficult to remove. As such, the intelligent polisher may include a level as shown in FIG. 3.

Trigger Time

Figure 4:
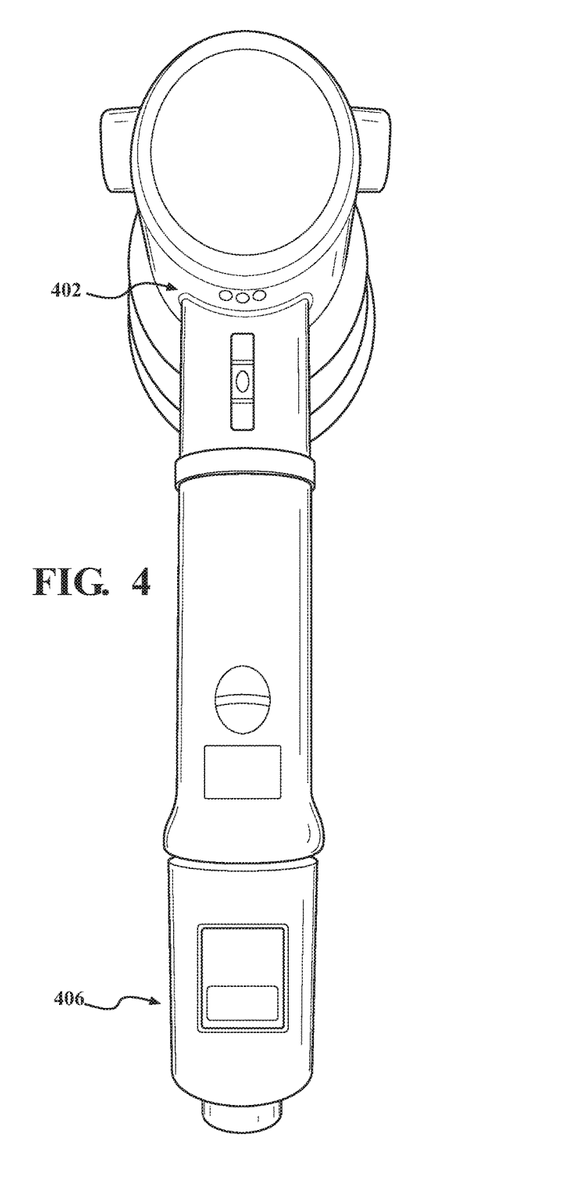
FIG. 4 is a top-down view of an intelligent polisher with speed and trigger time indicators.

This function decreases the time (in seconds) necessary to polish out a surface defect. For example, if the polisher is calibrated to 12 seconds, when the operator depresses the trigger an indicator light 402 will start to blink at the end of the input time, as shown in FIG. 4. This function is desirable due to the uniqueness of the different paint technologies being offered. The newer technologies exhibit different surface hardness, which results in increased polish times. If the operator cuts back on the desired time, the defect will not be completely removed. As such, when a customer takes delivery of a new painted vehicle, they may see a dull spot in the paint due to inadequate trigger time.

RPM Indicator

Rotational speed is critical when polishing paint. The polisher is manufactured and calibrated to run optimally at 12,000 RPM. If the polisher runs at too low a speed an "incomplete" polish marks may be present. That is, a defect may not be completely removed, resulting in a dull spot in the paint. In addition to the digital RPM readout 406 in FIG. 4, a colored light may blink until the desired RPM is reached.

Downward Pressure

The intelligent polisher has a built-in pressure pad on the top of the housing. When the operators palm makes contact with the polisher, a downward force is created. The proper force applied thru the polisher onto the painted surface is in the range of 3-5 lbs. If the operator does not apply the recommended downward pressure this could result in an incomplete repair and a dull spot in the surface. A built-in light will blink a particular color when the desired pre-calibrated force (in lbs) is achieved.

15 mm Random Orbital Pattern

Figure 5:
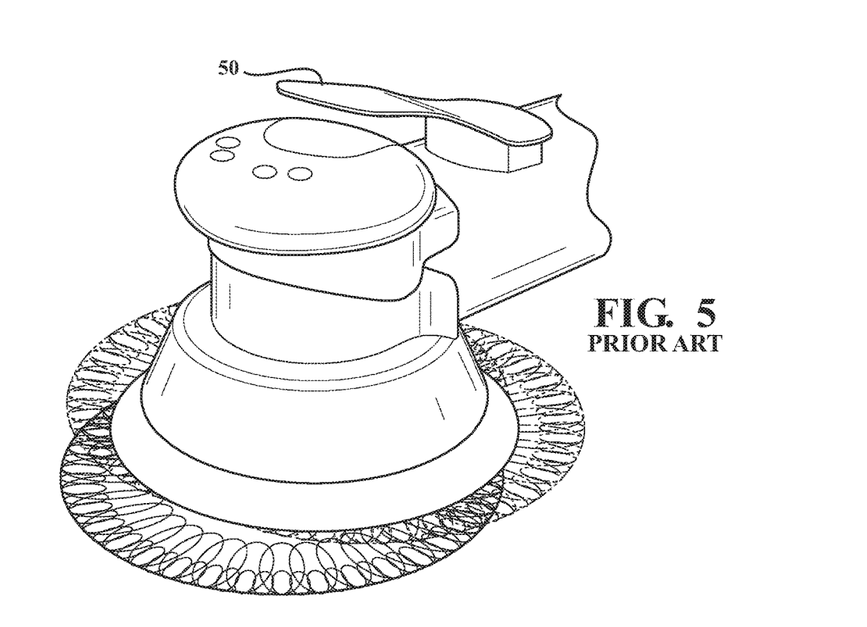
FIG. 5 is an oblique view of a polisher illustrating a problem associated with existing polishers.
Figure 6:
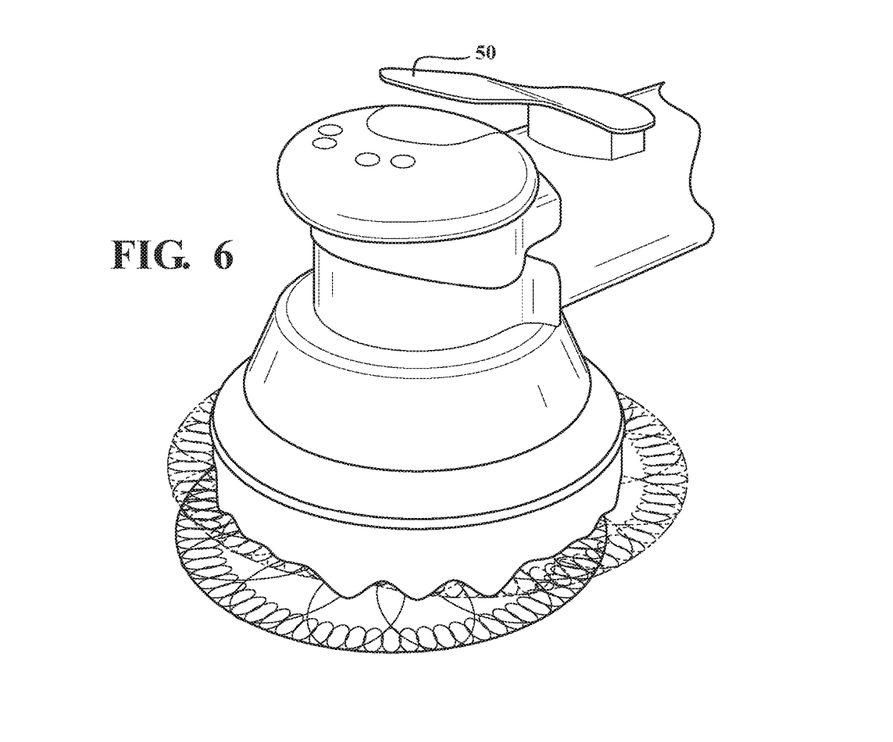
FIG. 6 is an oblique view of an intelligent polisher illustrating a 15 mm random orbital pattern that creates twice the random orbital action versus the conventional polishers of FIG. 5.
Figure 7:
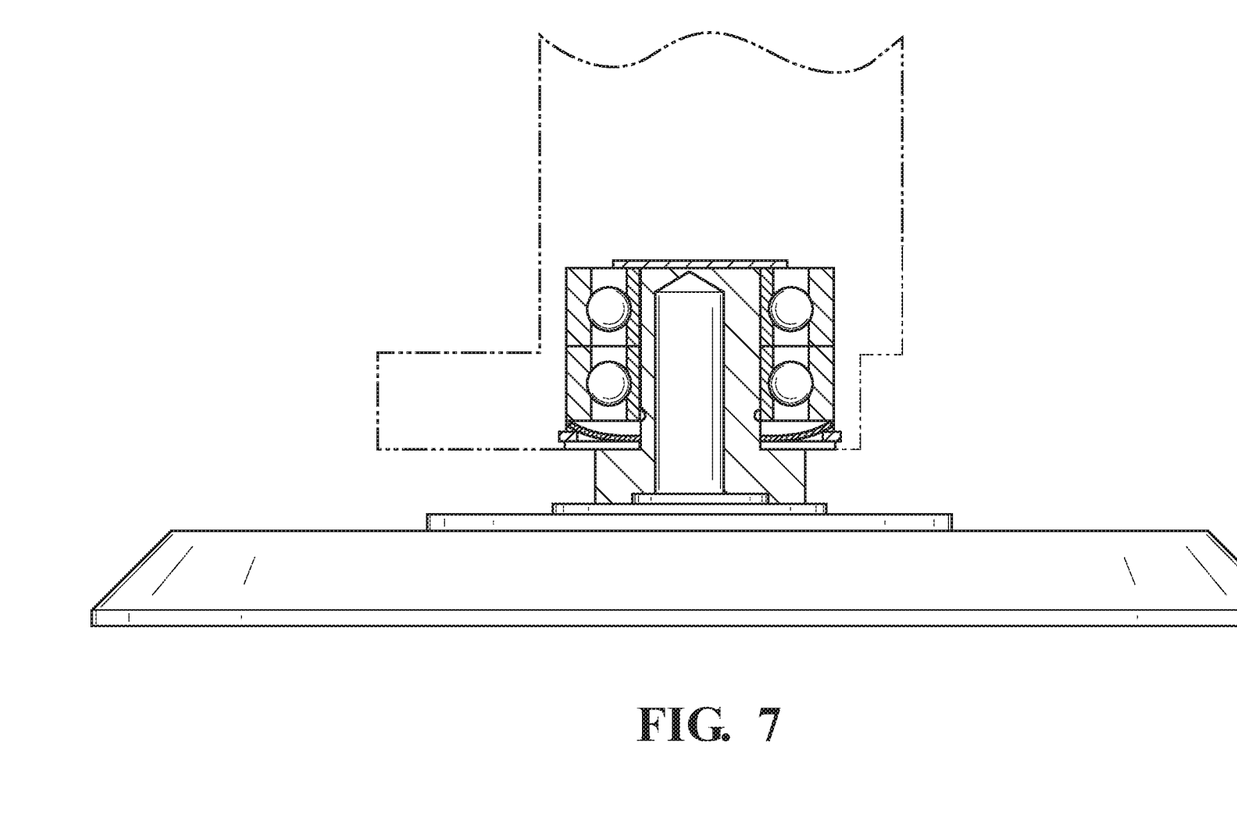
FIG. 7 is a cross sectional view showing the problem with a central rotational shaft.

The industry standard offers up to a 12 mm orbital pattern. However, as shown in FIG. 5, this results in a slower defect removal. The larger the orbital pattern, the more aggressive the swing, which results in faster defect removal. The preferred embodiment uses a 15 mm random orbital pattern (FIG. 6) that creates twice the random orbital action versus conventional polishers. This results in quicker defect removal.

Offset Center Shaft

When the center shaft of an orbital polisher is aligned with the center of the tool, vibration occurs (FIG. 6A). To address this problem, the preferred embodiment of this invention incorporates a slightly offset center shaft, which results in less vibration when polishing.

The preferred embodiment uses a dual-density foam pad as described and claimed in U.S. Pat. No. 9,089,943, the teachings of which are incorporated herein by reference. A further enhancement includes a pre-cocked high flow coupler that will not kick back when connecting the tool to an air line if pneumatically operated.

Figure 8:
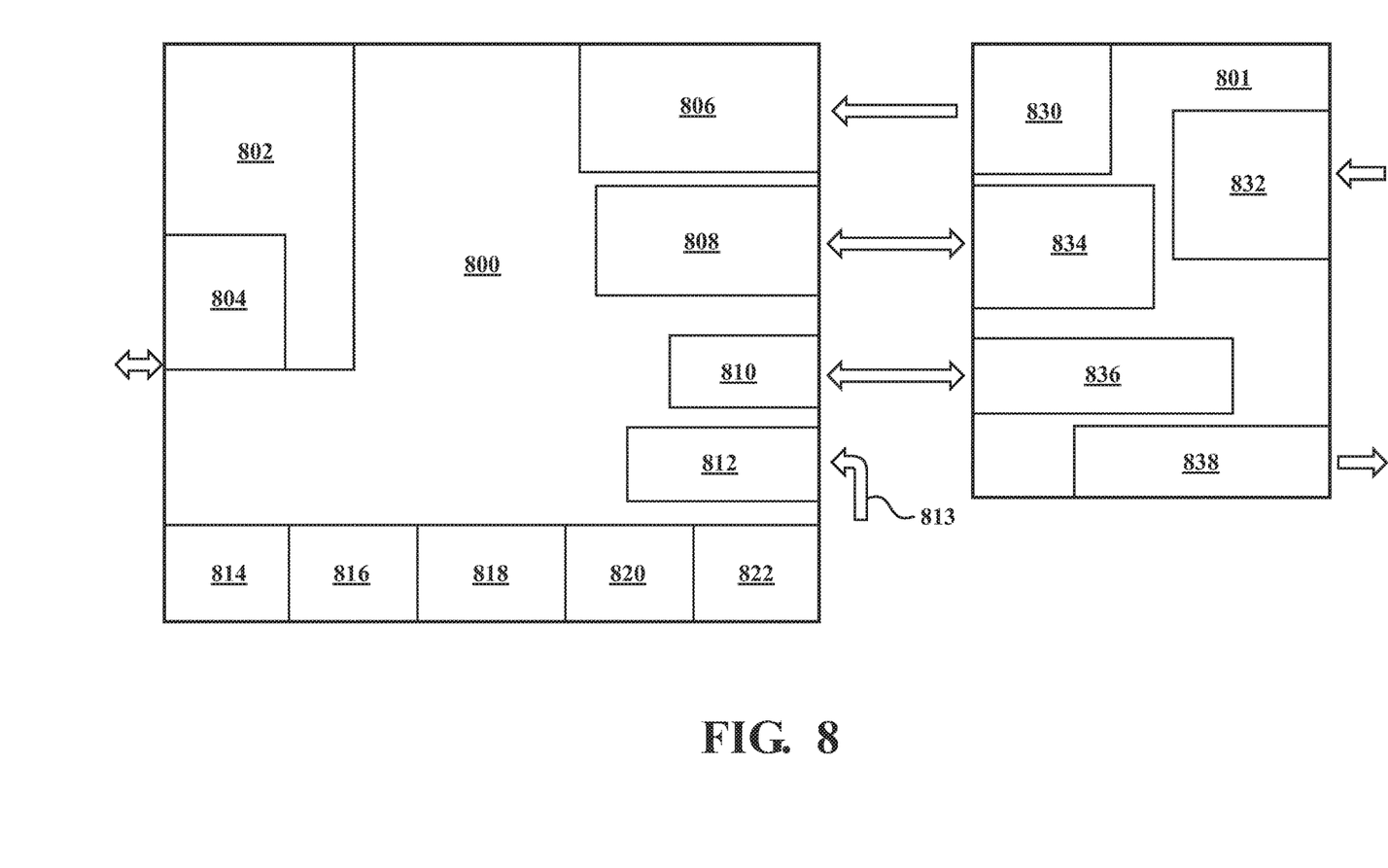
FIG. 8 is a block diagram showing an interface between RS-485 and PCB tool side components.

The tool may further include a dual-chamber, all-in-one air hose that allows both air and a data cable to connect to the intelligent polisher without having two separate cables. FIG. 8 is a diagram that shows the polisher electronics and electromechanical interface 800, and the polisher communications interface 801.

Block 802 represents the Microcontroller/CPU, including the other electronic circuitry such as analog-to-digital (A/D) conversion, communications, and so forth. The Microcontroller/CPU will read Pressure Sensor 818, Speed Sensor 820 and Trigger Sensor 822, and operate work light 814 and display lights 816 to indicate time of polish and other operations. The Microcontroller/CPU will also measure items such as the rotational speed of the polisher, time of trigger pull, downward force applied to the polishing pad, and input air pressure. Speed Sensor 820 measures the rotational speed of the polishing pad, and block 822 represents the electronics necessary to measure the state of the trigger. It is then used to compute the length of time the trigger was depressed.

The Microcontroller/CPU will make calculations as to the number of correct operations, as well as the number of incorrect operations of the polisher. It will also communicate with the host communication interface so various values may be read by the communication interface.

Software update port 804 may only be accessible only with partial, or complete disassembly of the Polisher. This port allows for future software updates.

Possible buck converter, filtering supply and other power input/conversion and filtering are depicted at 806. For example, power from another device in the case of a hardwired power pneumatic design.

Two-way communication interface 808 is the RS-485 interface to the Communication interface 801. It is a master/slave communication system with the Communication Interface being the master.

External I/O 801 refers to an extra pin used to sense if the Polisher is connected to a calibration station. The port will normally be held high, and pulled low if connected to the calibration station. In normal operation in the plant, this pin would terminate at the connector on the polisher. The circuit would not continue to the Communication Interface.

Inlet air pressure sensor 812 reads and monitors the air pressure from inlet 813. Besides the current reading, it may also compute average reading, number of times reading was too low, too high etc. The work light is shown at 814, and the warning display lights (probably LED's) are shown at 816. These lights are observable by the user of the polisher.

Interface 801 includes the power supply output to each Polisher. It may be in one Communication Interface, or a completely second PLC type of power output module. The Communication Interface 801 may include multiple PLC modules. One to convert from whatever RS-485 communication protocol is selected for the polisher, and another to communicate on the plant bus network. The other PLC module may just supply the 12-24 VDC to the Polisher. Block 832 is the Power conversion to the PLC type module, which is just shown for clarity.

Block 834 is the communication port out to the polisher communication input 808. Area 836 is the I/O needed for use with a calibration station. This would pull the I/O port 810 on the polisher low to indicate it is acceptable to receive calibration commands (i.e., 2 levels of security, one hardware wire, and also special calibration commands not used in normal mode at the plant).

Region 838 is the communication to whatever bus the Display units, PC's, Web interfaces etc are on. For example, we may use Modbus RTU for the Polisher, yet the plant requires Allen Bradley Ethernet/IP. This module would convert it, rather than rewrite the software in the Polisher for each unique installation.

The intelligent polisher may be provided with the ability to transfer data to a receiving device (such as the network server of FIG. 9, below), either in real-time or stored for future retrieval. If the data is transferred in real-time, it will be at a rate that is feasible for both the polisher and the receiving device. While wireless connectivity is preferred, the data transfer may be hardwired or via off-line download.

The intelligent polisher may also include its own memory for storing operational/performance parameters for either real-time or off-line download. Values may include those associated with control or monitoring of the functions of the polisher. Values may include, for example, calibration values to assure accuracy of the polisher.

In the case of calibration, those values will be transferred to and from the polisher via data transfer. To allow the calibration of the polisher, a secure message structure may be employed to assure that the polisher does not accidently enter into calibration mode during normal operation. The secure messages may only be transmitted by an appropriate calibration device. Single or multiple hard-wired signal lines may be asserted to a value or values to assure that the polisher is properly connected to a calibration device. The same signal lines would not be connected during normal operation of the polisher. The reverse is also allowed. That is, the signal lines may not be connected to the calibration device for normal operation. calibration values may be, but not limited to, items such as RPM, trigger time, downward force (i.e., applied pressure), and inlet air pressure. Additional calibration values may also be used.

Data transfer may be any protocol necessary to perform the requested functions. The protocol may be proprietary in nature or an industry standard communication protocol such as Ethernet/IP, Profibus, Mod bus RTU or other industry standard communication protocol if not proprietary in nature.

If necessary to communicate with an existing communication system, a translating device may be used as necessary. A single polisher may be the only device connected via the communication arrangement, or it may be one of multiple devices connected to the same communications infrastructure. When part of a larger network, as shown in FIG. 9, additional polisher(s) may connected via a similar method, or may communicate in a different protocol as desired.

Data storage may be employed for immediate or later, or real-time, analysis. Data storage and/or analysis may take place in the work area, at a remote location within a building, or at a remote location. Data transferred from the polisher may be available in a single or multiple displaying device(s). Such a device may include an industrial screen, a laptop, lights, buzzers, or other methods of conveying the information necessary to monitor the intended functions.

Figure 9:
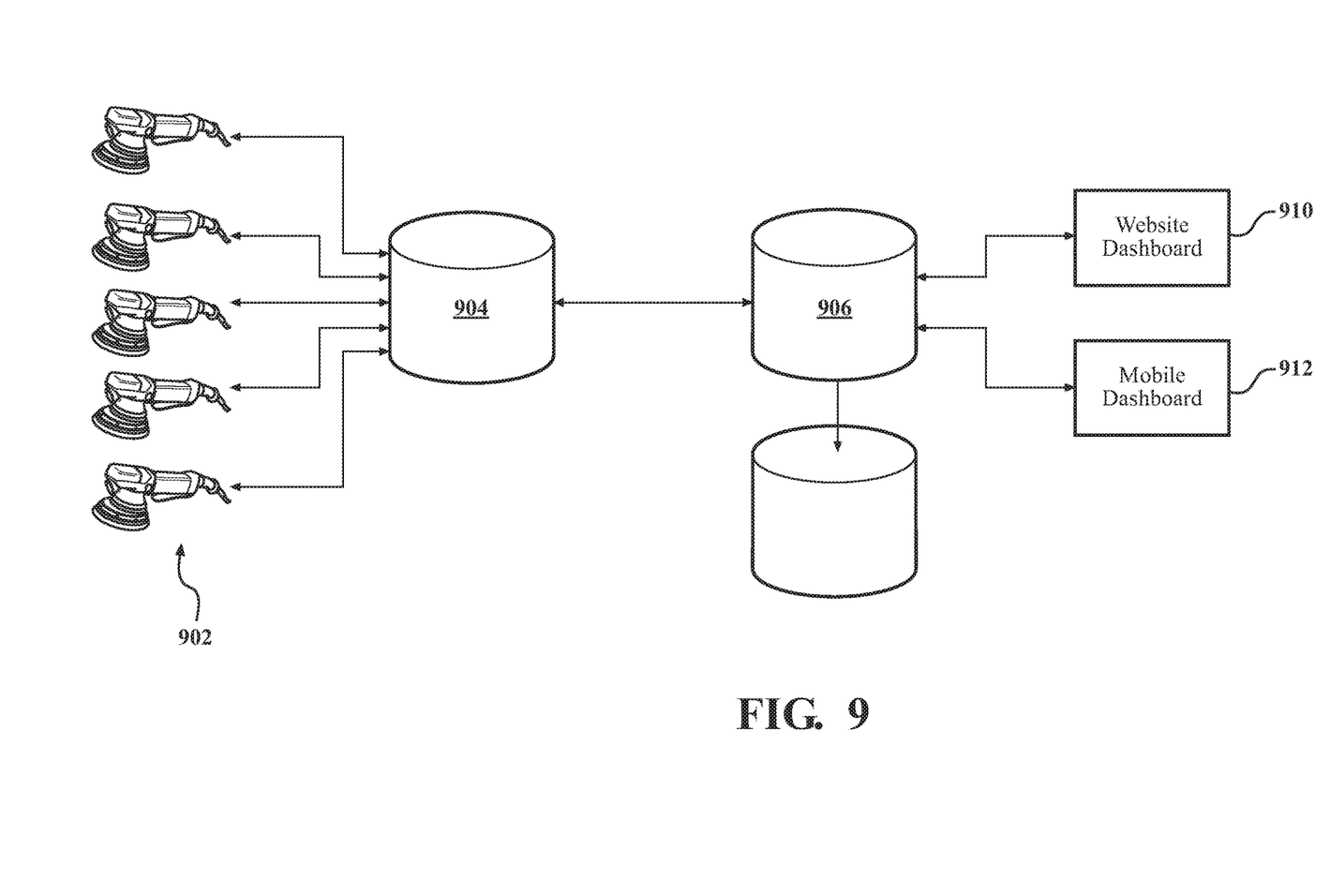
FIG. 9 depicts a fully integrated system accommodating multiple intelligent polishers and web-based monitoring.

As shown in FIG. 9, a displaying device may be available for viewing to the operator interfaced to the website or mobile dashboards 910, 912. As such, the displaying device may be monitored remotely, away from the work area. In other words, displaying devices may not be limited to existing in the area or building of the polisher. The displaying device may be at a remote location.

Real-time data analysis may include alerts to the operator or monitoring personnel. Analysis may include those items necessary to get statistical information on parameters such as downward force, inlet air pressure, RPM, time of trigger activation as well as others. Real-time analysis may also result in alerts to the operator and/or operating personnel to failure to follow minimum or maximum operating guidelines of the polisher. Methods to convey the alerts may include, but are not limited to, such items as direct operator feedback, lights, sound activating devices, displaying device notifications, and others. Data storage of the alerts may also be employed for later analysis or company compliance.

Data analysis and storage may be used to monitor correct functionality of the polisher. For example, the polisher may store out-of-range values which would indicate incorrect functionality of the polisher. This storage and/or analysis may take place within the polisher, or it may take place at one of the remote monitoring locations. An example of an out-of-range value would be too low of RPM with no downward force applied and the correct inlet air pressure provided to the polisher. Data analysis may also be used to verify correct operation of the air and electrical supply to the polisher.

The polisher may include a backup battery to continue to collect information if communication is lost with the host device. In the case of wireless communication the power may be provided by battery within the device or may be provided via external hardwire. In the case of a polisher which is not functioning correctly, it may be possible to alert the operator through an indicating device such as, but not limited to, vibration, lights, sounds or some other method to signal to the operator incorrect functionality. In the case of a polisher which is not functioning correctly, it may be possible to shut the air supply to the polisher off.

The polisher may also employ behavior learning ability of the operator. One example would be: "does the operator pull the trigger before applying downward force at activation or does the operator apply the downward force first before applying pressure?" This data may be used to monitor operator behavior to later compare to operational results. This data may also be used to verify that the operator is following proper operational use of the polisher.

The polisher may also be monitored for the correct connect/disconnect procedure. In the case of an air inlet hose, there may be a tendency for the hose to pull away from the polisher rapidly when disconnected. This could result in extra strain on the connecting cable in the case of a hardwired installation. The polisher may be monitored so that the electrical connection is removed first, prior to removing the air inlet hose. Conversely, upon connection, the air inlet hose would be connected first, and then the electrical connection.

Networking Capability

In addition to the enhancements to the tool itself made possible by the invention, in accordance with a system aspect, multiple intelligent polishers may be wirelessly interconnected to a server, facilitating numerous advantages including website monitoring for increased productivity. As shown in FIG. 9, multiple tools 902 may be is wireless, bidirectional communication with a two-way hub 904. The hub 904 may be wall-mounted or disposed at any other operative location, and any wireless communications protocol may be used, including Xbee, WiFi, etc.

The hub 904 uses preferably dedicated power and nodes/websockets to communicate with the intelligent polishers 902. The hub 902 uses TCP/IP to communicate with an applications server 906. The server may be hosted centrally by an OEM in a datacenter or cloud-based. The application server, which stores data from multiple polishers 902 in a database server 908, can also handle multiple locations/facilities and shops through appropriate ID. The application server facilitates both a website dashboard(s) 910 and/or mobile dashboard(s) 912, enabling users to monitor and control shop modifications allowed by permission level, for example, including history of tool use and operational parameters for all allowed locations.

The invention claimed is:

1. An intelligent polishing system adapted to remove scratches and imperfections in painted surfaces, comprising:
a hand-held polisher including a rotating shaft driven by an electrical or pneumatic source of power;
a user control operative to start and stop rotation of the rotating shaft;
a polishing pad coupled to the shaft through a mechanism causing the pad to assume an orbital motion with respect to a work surface;
a timer operative to monitor the amount of time that the polisher is used to polish a work surface, and an indicator on the polisher informing a user when the predetermined amount of time has been reached;
a pressure sensor operative to monitor the amount of pressure that a user is applying to the work surface while polishing, and an indicator on the polisher informing the user that a predetermined amount of pressure has been achieved; and
a source of illumination disposed on the housing, and wherein the source of illumination emits light directed downwardly and toward the work surface with a color temperature of at least 5000 degrees Kelvin to enhance the visualization of scratches and imperfections in the work surface as they are removed by the polisher.

2. The system of claim 1, further including a tachometer operative to measure speed of the rotating shaft in revolutions per minute (RPM); and
an indicator enabling a user to know if the speed is within a predetermined range.

3. The system of claim 1, further including a memory for storing operational parameters or performance characteristics of the intelligent polisher for later downloading or retrieval.

4. The system of claim 1, further including a memory for storing calibration information to ensure that intelligent polisher operates within predetermined limits.

5. The system of claim 4, wherein the calibration information includes RPM, polishing time, downward force or inlet air pressure.

6. The system of claim 1, further including communications circuitry in the polisher enabling operational parameters or performance characteristics to be stored in a remote database.

7. The system of claim 1, including a plurality of intelligent polishers, each in communication with a server enabling remote monitoring or control of the polishers through a computer or mobile device.

8. The system of claim 7, wherein the intelligent polishers are in two-way communication with the server, enabling a user of the computer or mobile device to alert a user of an intelligent polisher that the user is outside operational or performance guidelines.

9. The system of claim 7, further including a memory for storing information regarding operator use of the intelligent polisher for comparisons with subsequent use to improve operator usage behavior.

10. The system of claim 1, further including an offset shaft to reduce vibration.

11. The system of claim 1, further including a random orbital pattern greater than 12 mm to decrease required polishing time.

* * * * *